June 28, 1960 R. HELL 2,943,148

APPARATUS FOR TRANSMITTING TELEPRINTER CHARACTERS

Filed April 4, 1955 2 Sheets-Sheet 1

Inventor:
Rudolf Hell,
By [signature] Atty.

Inventor:
Rudolf Hell.
By [signature] Atty.

United States Patent Office 2,943,148
Patented June 28, 1960

2,943,148

APPARATUS FOR TRANSMITTING TELEPRINTER CHARACTERS

Rudolf Hell, Kiel-Dietrichsdorf, Germany, assignor to Dr.-Ing. Rudolf Hell Kommanditgesellschaft, Kiel, Germany, a German company Filed Apr. 4, 1955, Ser. No. 499,178

Claims priority, application Germany Apr. 28, 1954

7 Claims. (Cl. 178—17)

This invention relates to apparatus for transmitting teleprinter characters.

There are teleprinters known—referred to abroad as "Hellschreiber," the term "Hell" being the name of the originator who is also the inventor in the present case—in which characters are transmitted subdivided in accordance with picture elements. Each character is in the transmitter arranged on a cam disk in the form of a succession of picture elements, such elements becoming effective by the actuation of key means for transmitting the corresponding picture element impulses over a transmission line. It is also generally known to store such impulses on a magnetic tape from which they are subsequently released. In the case of other teleprinters using for the representation of the characters impulse combinations corresponding thereto, it has been proposed to transfer the impulse groups for storing simultaneously to a magnetic tape adapted for stepwise motion, while the tape is in stop position. Such magnetic storing methods serve for conserving the teleprinter characters for later use and also for measurement purposes.

The invention proposes to make use of magnetic impulse storing for the purpose of converting teleprinter characters in simple manner into impulse series corresponding to picture elements.

According to the invention, the picture elements of a character are as a group simultaneously magnetized upon an endless uniformly moving magnetizable storing element, for example, upon a peripherally magnetizable uniformly rotating storage disk, and are directly thereafter in spaced time sequence taken off from the storing element and transmitted as picture element impulses. By arranging the picture elements for each character or symbol upon the head of an imprint or transfer bar, for example, as relief pictures, in a magnetic material or as a magnetic condition of such material, and actuating the imprint bar by key operation so as to move its head momentarily against the moving peripherally magnetizable storing disk, the picture elements will be simultaneously magnetized upon the storing disk and can be subsequently taken off with a pickup head as impulse series for transmission over a transmission line. The peripherally magnetizable storage disk is common to all imprint bars. A magnetizable endless tape may be used in place of the peripherally magnetizable storage disk.

The invention uses only a single continuously rotatable magnetizable member, for example, the above noted rotating disk-like storing member, as compared with the initially mentioned "Hell" transmitter in which the number of cam disks corresponds to the number of symbols.

The construction of a transmitter is thereby extraordinarily simplified. The operation, due to avoidance of a multiplicity of contacts and use in their stead of a single pickup head, is with certainty reliable and does not need any particular attention. The construction of the key assembly and of the imprint bars can largely follow along the lines of typewriters and the production costs of a transmitter according to the invention are accordingly as compared with known structures reduced.

The invention offers particular advantages in the case of operation according to the start-stop principle. In such case, there is provided upon the type head of the imprint bar in addition to the magnetic picture elements a magnetic start element which produces the start impulse as the first impulse so as to start a receiver, for example, of the kind as described in the Swiss Patent No. 180,539. Therefore, while the magnetizable storing disk rotates in the transmitter continuously, the receiver will be actuated in start-stop-operation. A gapless recording of the characters will be obtained in the receiver even with changing transmitter speed.

The previously mentioned "Hellschreiber" system uses very simple receivers but requires relatively complicated transmitters. The present invention provides similarly simple transmitters.

It is immaterial for the invention whether the picture elements are magnetized upon the storage element or disk as direct current impulses or as tone frequency impulses or as high frequency impulses or whether they are represented upon the storage element or disk in the form of negative imprints by cancellation in case of continuous alternating frequency recording.

The invention will now be explained with reference to the accompanying diagrammatic drawings in which.

Figure 3:
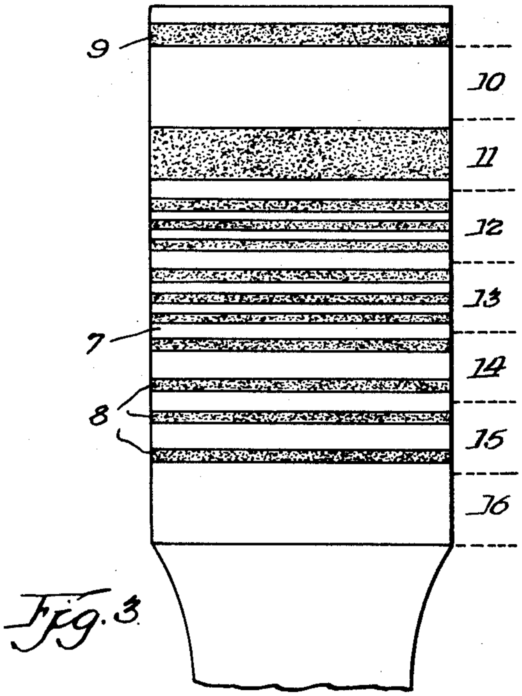
Figure 4:
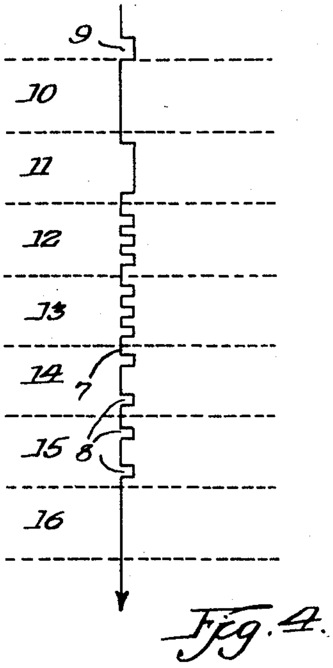
Figure 5:
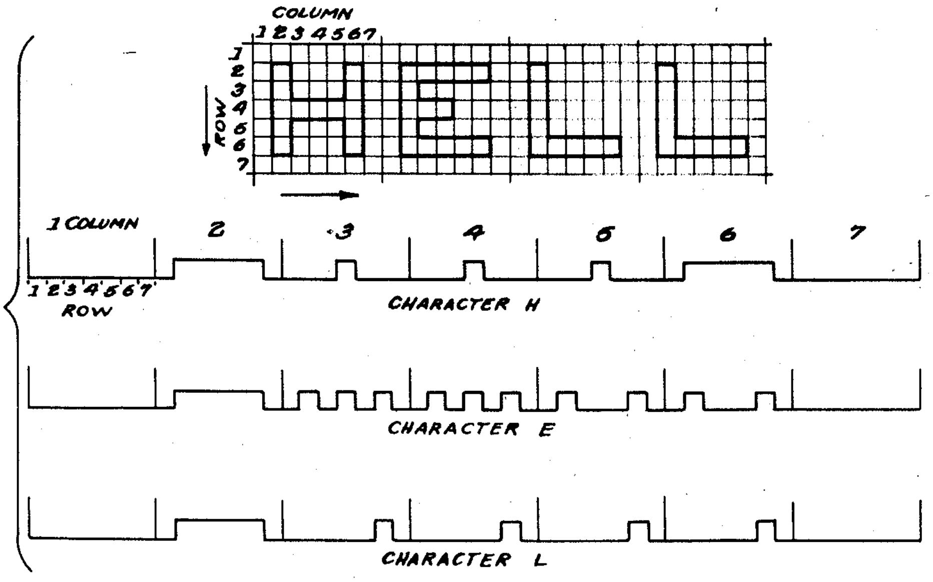

Fig. 3 indicates an example of the type head of the imprint bar carrying the picture elements of a character;

Fig. 4 shows the wave form of picture impulses corresponding to the picture elements indicated in Fig. 3; and Fig. 5 shows in diagrammatic manner the subdivision of symbol fields and the wave forms for the characters H, E and L, the wave form for the character E being also shown in Fig. 4.

Figure 2:
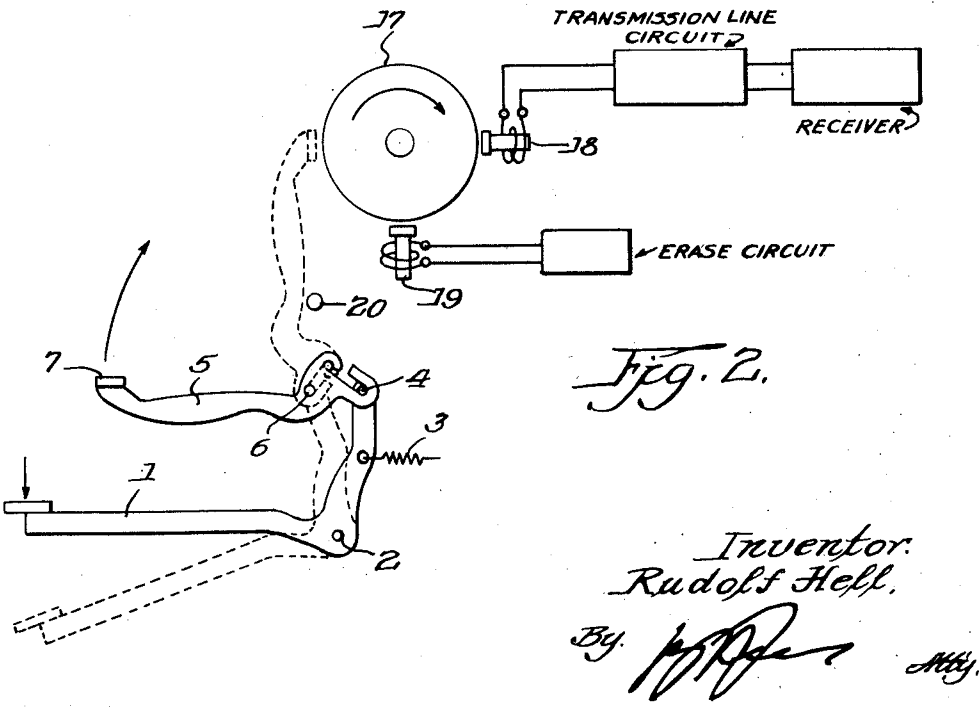
Fig. 2 illustrates schematically the elements required for the recording and pickup of the characters.

The manner of magnetizing the characters upon a magnetizable carrier or storage element is apparent from Fig. 2. The key or actuating lever 1 is pivotally journalled at 2 and is maintained in its normal position by a spring 3. The end of an imprint bar 5 which is pivotally journalled at 6 is linked with an extension 4 of the key lever. The head 7 of the imprint bar 5 carries the picture elements of a character or symbol arranged in a row thereon, as shown more in detail in Fig. 3. The head 7 is made of magnetic material carrying the picture elements 8 in the form of portions raised from the general plane thereof. Numeral 9 shows the raised portion representing the start signal followed by the picture elements for reproducing the character E which are respectively contained in the scanning lines 11 to 15, numerals 10 and 16 representing the marginal zones of the character.

The magnetizable disk or drum 17 (Fig. 2) rotates in the direction of the arrow with uniform speed relative to the pickup head 18 which is included in the circuit of the transmission line, the disk accordingly also rotating relative to the erase head 19 which is by suitable means connected in a direct current circuit. Upon downward depression of the key 1, the imprint bar 5 will be rotated clockwise in the direction of the arrow to a point defined by the stop 20 thereby throwing the head 7 into an actuated terminal position close to the disk 17 but without touching it. The picture elements 8 and 9 are thereby magnetized upon the disk or wheel 17. The imprint bar 5 restores by reactive force upon hitting the stop 20. The speed of rotation of the disk 17 is such that smudging of the picture elements is avoided incident to the magnetizing thereof. The polarized area on the rotating disk 17 having the picture element of a symbol or character magnetized thereon, reaches the pickup 18 and the picture impulses corresponding to the picture elements are accordingly successively taken off in the form of an impulse series as illustrated in Fig. 4. This impulse series is in known manner transmitted to a start-stop receiver which records the character E in accordance with known practice.

The sequence of impulses in connection with the transmission of the characters H, E, L is apparent from Fig. 5.

Figure 1:
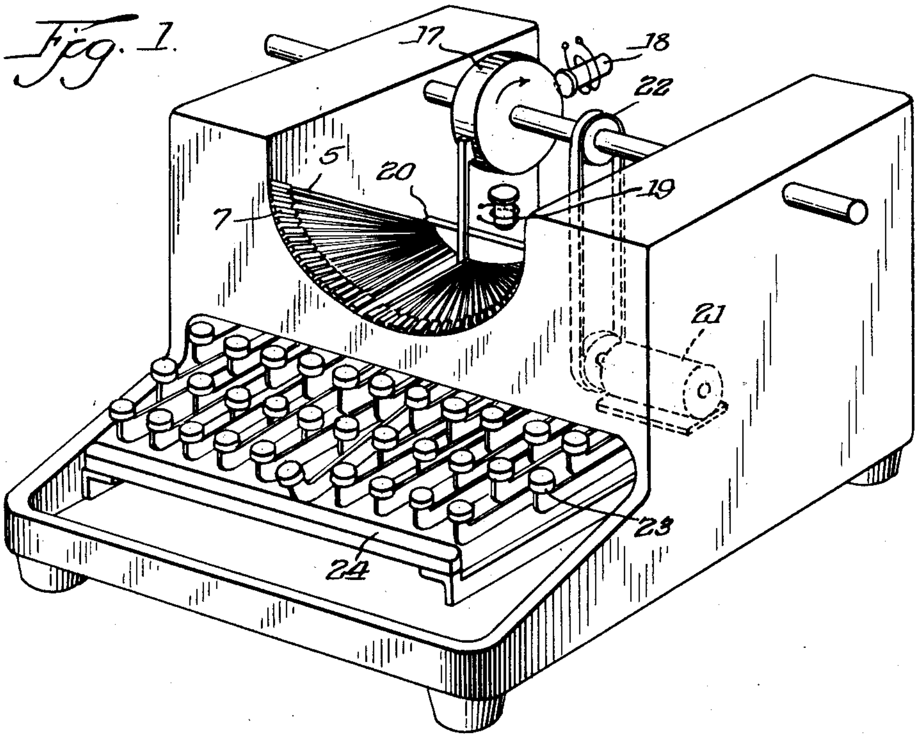
Fig. 1 shows in schematic manner a transmitter.

Fig. 1 shows the transmitter. A motor 21 rotates the magnetizable disk 17 by means of a belt drive 22. The pickup and erase heads are respectively indicated at 18 and 19. The keyboard 23 is constructed similar to a typewriter keyboard and comprises a space bar 24 to which is allotted the start signal. The imprint or transfer bars 5 with their heads 7 are respectively moved relative to the disk 17 by actuation of their respectively associated key-operated actuating levers. The stop 20 determines the magnitude of the gap between the heads 7 of the imprint bars and the magnetizable disk 17.

The recording upon the magnetizable disk 17 may also be effected by high frequency oscillations (alternating magnetization) transferred thereto by a recording head taking the place of the head 19 and the signals thus recorded may be individually cancelled or erased by the picture elements carried by the heads 7. The corresponding operation produces a negative script. The interruptions in the alternating magnetization are taken off by the pick-up head 18 and retransmitted as before and thereafter replaced by the head 19.

Changes may be made within the scope and spirit of the appended claims.

I claim:

1. Teleprinter apparatus for the transmission of symbols which are respectively subdivided into picture elements by means of impulse series which correspond to the binary symbol sequence resulting from the subdivision of the respective symbols in black-white picture elements of identical size, comprising a key set similar to a key set of a typewriter and including a plurality of key levers corresponding in number to the number of symbols to be transmitted, type levers comprising type heads and operated by the key levers, each of said type heads carrying a plurality of predetermined substantially permanent magnetic impressions forming a group of impressions thereon which represents an impulse series allocated to a particular symbol to be transmitted, a movable endless magnetizable storage element operatively mounted with respect to said key set, means for uniformly continuously moving said element, means operatively related to each of the key levers of the key set and operative responsive to operation of the keys for actuating the corresponding type levers so as to move the respective type heads momentarily relative to the aforesaid uniformly continuously moving magnetizable storage element for the purpose of successively magnetically impressing thereon the respective groups of magnetic impressions representing groups of impulse series, means whereby each type head is operative to simultaneously magnetically impress on said storage element all impulses of the impulse series comprising the group associated with the respective type head, a magnetic pickup head for immediately after the impression of a group of impulse series on said storage element successively scanning the individual signals of such series for the transmission thereof in the form of impulses, and a magnetic erase head for successively erasing the groups of impulse series after the scanning thereof by said pickup head.

2. Apparatus as set forth in claim 1, wherein the magnetic representation of the impulse series upon each of said type heads comprises serially arranged mutually adjacent rectangular elevations and depressions of a magnetizable material.

3. Apparatus as set forth in claim 1, wherein the magnetic representation of the impulse series upon each type head comprises serially disposed and contiguous rectangular zones of magnetizable material which is subject to abrupt alteration of a magnetic density.

4. Apparatus as set forth in claim 3, wherein each of said type heads comprises an auxiliary magnetic element disposed thereupon ahead of the magnetic representation of the corresponding impulse series, said element being operable incident to the scanning thereof by said pickup head to provide a starting impulse for a receiver to which the impulse series are transmitted.

5. Apparatus as set forth in claim 3, wherein the magnetizable material for the magnetic representation of the impulse series upon each of the type heads comprises permanent magnets.

6. Apparatus as set forth in claim 3, wherein the magnetizable material for the magnetic representation of the impulse series upon each of the type heads comprises electromagnets.

7. Apparatus as set forth in claim 1, wherein said rotatable and magnetizable storage element is a peripherally magnetizable disk.

References Cited in the file of this patent

UNITED STATES PATENTS

| | | |
|---|---|---|
| 2,337,553 | Hofgaard | Dec. 28, 1943 |
| 2,511,121 | Murphy | June 13, 1950 |
| 2,560,474 | Potts | July 10, 1951 |
| 2,567,812 | Hickman | Sept. 11, 1951 |
| 2,614,169 | Cohen | Oct. 14, 1952 |
| 2,672,944 | Minton | Mar. 23, 1954 |
| 2,729,803 | Harrison | Jan. 3, 1956 |
| 2,759,171 | Fleming | Aug. 14, 1956 |
| 2,784,392 | Chaimowicz | Mar. 5, 1957 |
| 2,791,310 | Jones | May 7, 1957 |
| 2,842,616 | Snijders | July 8, 1958 |

OTHER REFERENCES

Berry and Hanna: (Ferromagnetography—High Speed), General Electric Review, July 1952, 3 pages relied on. (Copy in Division 42, 178–23, pages 20–22.)